(12) United States Patent
Prestenback et al.

(10) Patent No.: US 10,271,005 B2
(45) Date of Patent: Apr. 23, 2019

(54) EVENT STATE MONITORING FOR MULTIPLE PLATFORMS ASSOCIATED WITH A USER ACCOUNT

(75) Inventors: Kyle Prestenback, Burbank, CA (US); Evan Tahler, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 1318 days.

(21) Appl. No.: 12/238,366

(22) Filed: Sep. 25, 2008

(65) Prior Publication Data
US 2009/0304344 A1 Dec. 10, 2009

Related U.S. Application Data

(60) Provisional application No. 61/059,670, filed on Jun. 6, 2008.

(51) Int. Cl.
| | | |
|---|---|---|
| H04N 5/765 | (2006.01) | |
| H04N 21/258 | (2011.01) | |
| H04N 21/422 | (2011.01) | |
| H04N 21/426 | (2011.01) | |
| H04N 21/475 | (2011.01) | |
| H04N 21/478 | (2011.01) | |

(52) U.S. Cl.
CPC ....... H04N 5/765 (2013.01); H04N 21/25891 (2013.01); H04N 21/42204 (2013.01); H04N 21/42646 (2013.01); H04N 21/4751 (2013.01); H04N 21/4781 (2013.01)

(58) Field of Classification Search
USPC ........................................................ 709/207
See application file for complete search history.

(56) References Cited

U.S. PATENT DOCUMENTS

| | | | |
|---|---|---|---|
| 5,579,221 A * | 11/1996 | Mun ............................... 700/83 |
| 5,842,009 A * | 11/1998 | Borovoy et al. | |
| 6,216,158 B1 | 4/2001 | Luo et al. | |
| 6,829,630 B1 * | 12/2004 | Pajak et al. ................... 709/201 |
| 7,339,484 B2 | 3/2008 | Pradhan et al. | |
| 2001/0046366 A1 * | 11/2001 | Susskind ......................... 386/46 |
| 2002/0052980 A1 | 5/2002 | Sanghvi et al. | |
| 2004/0093379 A1 * | 5/2004 | Roh et al. ..................... 709/203 |
| 2006/0294181 A1 | 12/2006 | Barzacanos et al. | |
| 2007/0124424 A1 | 5/2007 | Matsuda | |
| 2007/0291761 A1 * | 12/2007 | Kauniskangas ......... H04L 12/66 370/395.2 |
| 2008/0106600 A1 | 5/2008 | Benco et al. | |

OTHER PUBLICATIONS

Schaefer et al., "Dialog Modeling for Multiple Devices and Multiple Interaction Modalities" SpringerLink—Book Chapter, www.springerlink.com/content/83853515623vu535?print=true, (Abstract only), 2 pages, obtained on Sep. 23, 2008.

* cited by examiner

Primary Examiner — Maceeh Anwari
(74) Attorney, Agent, or Firm — Patent Ingenuity, P.C.; Samuel K. Simpson

(57) ABSTRACT

Subject matter disclosed herein may relate to monitoring state information for one or more events across one or more platforms associated with a user account, and providing event information appropriate for an electronic device to a the electronic device for display to a user associated with the user account. The user may provide inputs related to one or more of the events via the electronic device, and the inputs may be transmitted to one or more platforms.

18 Claims, 6 Drawing Sheets

EVENT STATE MONITORING FOR MULTIPLE PLATFORMS ASSOCIATED WITH A USER ACCOUNT

This patent application claims benefit of and priority to U.S. Provisional Patent Application 61/059,670, filed Jun. 6, 2008, and titled "Event State Monitoring for Multiple Platforms Associated With a User Account", and which is incorporated in its entirety by reference herein.

FIELD

Subject matter disclosed herein may relate to monitoring state information for one or more events across one or more platforms associated with a user account.

BACKGROUND

Digital video media continue to increase in popularity. For example, optical video discs may provide very high quality images and audio, and may provide a wide range of content, such as, for example, motion pictures. Such discs may be played by electronic devices, such as, for example, standalone video playback devices that may provide video and audio signals to televisions, receivers, and/or a number of other audio/visual components. Such electronic devices may also feature connections to networks such as the Internet. Motion picture distribution companies, sometimes referred to as studios, as well as other content providers, may be interested in providing additional features on discs and/or other media to entice consumers to purchase, rent, or otherwise view their digital video content.

DETAILED DESCRIPTION

Figure 1:
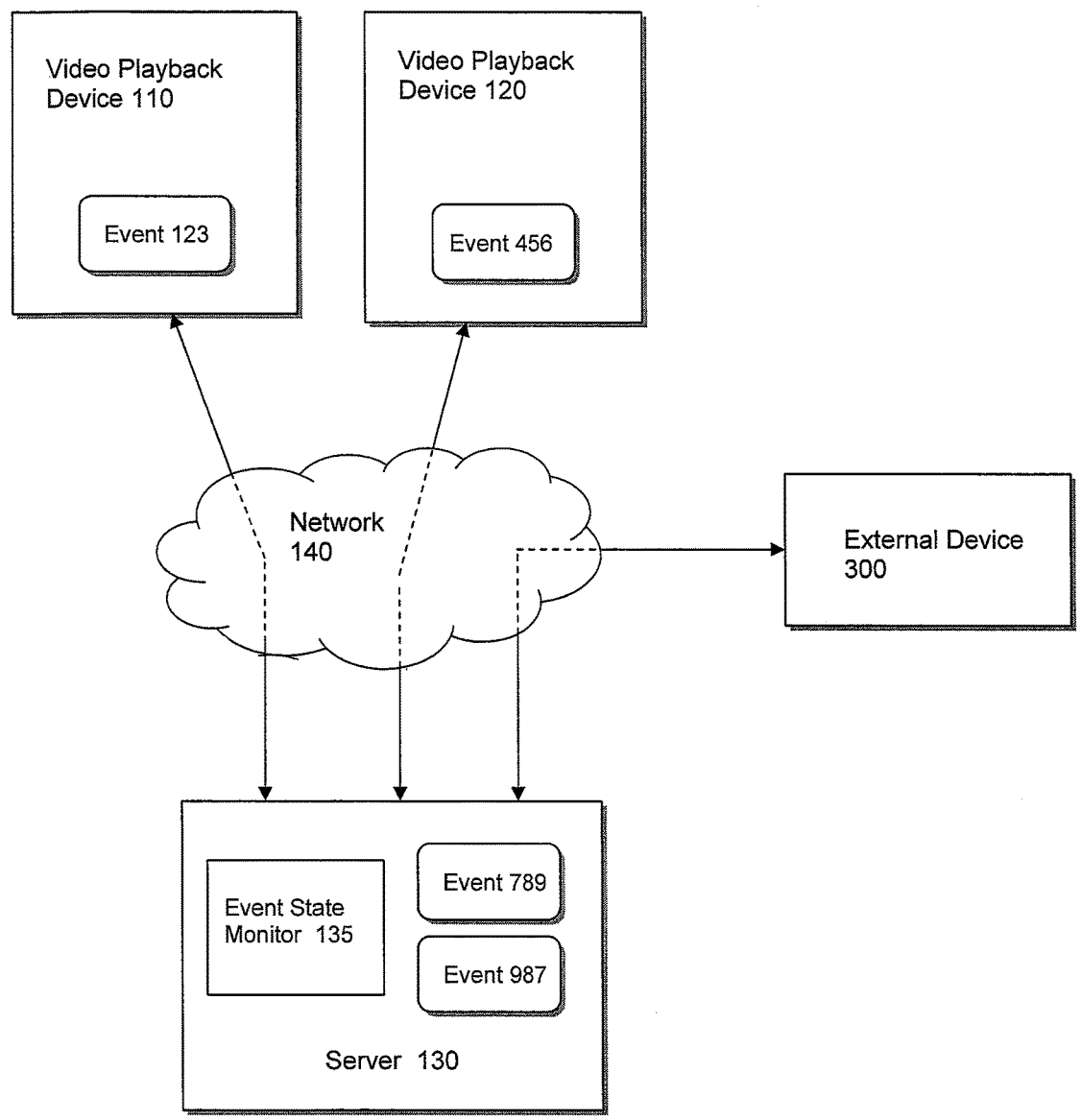
FIG. 1 is a block diagram of an example system including digital video playback devices and an external device coupled to a server computing platform.

As discussed above, motion picture studios, as well as other content providers, may be interested in providing features and/or applications on discs and/or other media along with the movies to entice consumers to purchase, rent, and/or otherwise view their digital video content. For some of these features, it may be desirable to allow users to interact with multiple devices in an event-driven architecture, examples of which are described herein. It may also be advantageous to allow users to use external, remote devices to provide inputs and/or to display information related to various events.

For one example, a user may desire to control playback of a movie on a video playback device from a cellular telephone. The cellular telephone in this example may be used to control playback of the movie on any playback device that is associated with the user. Also, for an example, information related to a scene in the movie may be displayed on the cellular phone. For another example, a user may desire to participate in a chat session with one or more friends hosted on a video playback device and/or hosted by a central server, and may desire to participate using a personal digital assistant. Other examples are described herein.

As used herein, an event may comprise an application or other type of activity with which a user may interact. For example, an event may comprise a movie displayed on a video playback device. Additional examples may include, but are not limited to, games, chat sessions, and/or other messaging applications. Events may further comprise any activity in which a user may partake on one or more system-connected devices. Events may have distinct start and stop times, and/or may be designated as "running", or "paused", for example.

System-connected devices for example embodiments described herein may include any electronic device coupled with other electronic devices via a network. The network may comprise a local area network in an example embodiment, such as, for example, a home and/or small office network, or may comprise a larger network such as, for example, the Internet. Cellular telephone networks may comprise yet another example of a network that may be used to couple electronic devices.

In order to allow a user to participate in system events, state information for one or more events and/or for one or more system-connected devices associated with a user may be tracked at a central server, for one example embodiment. A state tracker may maintain a list of system-connected devices associated with a user account, and may track activities occurring at each of the system-connected devices. For example, if a user is playing a game on a video game console, the state tracker may receive updates related to activities undertaken by the user. If the user is also viewing a movie on a different system-connected device, the state tracker may further receive updates related to the status of the movie. For example, the state tracker may receive an indication that the movie has been "paused" while the user is playing the game on the other system-connected device. The state tracker may also be made aware of events occurring in the future such as, for example, a planned chat session with one or more friends.

For one or more embodiments, the state tracker may monitor inputs provided by the user from external devices. Types of inputs that may be provided by a user at an external device may include, but are not limited to, text, playback commands, joystick commands, pointing device commands, etc., to name but a few examples. As used herein, the term "external device" is meant to include any electronic device capable of executing instructions and transmitting information over a network to a computing platform such as a server. Example types of external devices may include, but are not limited to, cellular phones, personal digital assistants, personal music players, notebook computers, desktop computers, video game consoles, portable game systems, etc. For one example embodiment, an external device may comprise any device capable of displaying a Web page.

FIG. 1 is a block diagram of an example embodiment of a system comprising a video playback device 110 and a video playback device 120 coupled to a server 140 via a network 140. For an embodiment, network 140 may comprise the Internet. In another embodiment, network 140 may comprise a local area network (LAN). Further, in one or more embodiments, network 140 may comprise a wireless network. The system depicted in FIG. 1 may also comprise an external device 300 coupled to server 140. For this example embodiment, external device 300 may comprise a cellular telephone.

The system depicted in FIG. 1 is meant to illustrate an example system wherein video playback devices are coupled to a computing platform such as a server. The video playback devices may execute applications that may permit communication among various video playback devices, such as, for example, a messaging application wherein a user may deliver messages related to movie content to other users. Further, the video playback devices may execute any of a wide range of applications.

For one or more embodiments, and as more fully described below, a user may provide inputs for an application being executed on one or more video playback devices, such as video playback devices 110 and 120, via an external device such as device 300. The inputs from external device 300 may be transmitted to server 130, and the inputs may subsequently be transmitted to video playback devices 110 and/or 120, for example. Server 130 may comprise an event state monitor 135. Event state monitor may be implemented in hardware, software, or in a combination of hardware and software.

For one example embodiment, video playback devices 110 and/or 120 may comprise optical disk players compatible with and/or compliant with the Blu-Ray 2.0 format. For one or more embodiments, digital video object playback device 110 may comprise a processor (not shown) that may execute instructions stored on a storage medium (also not shown). Also for an embodiment, a software framework and/or a software application may be loaded into one or more of playback devices 110 and 120 and stored in the storage medium. For one or more embodiments, the framework and/or application may be bundled with a movie object so that if a movie disk is inserted into a playback device, the framework and application may be loaded into the playback device storage medium.

As used herein, the term "video playback device" is meant to include any electronic device that may process and/or display a video object. For an embodiment, a digital video object playback device may comprise a stand-alone optical video disk player. For another embodiment, a digital video object playback device may comprise a computing platform such as, for example, a laptop computer.

For the example system depicted in FIG. 1, video playback devices 110 and 120 may comprise playback devices installed in a user's home. For example, playback device 110 may be positioned in the user's living room, while playback device 120 may be installed in the bed room. The user may, for this example, have access to each video playback device. Further, each of playback devices 110 and 120 may be accessible by more than one user. In one embodiment, one or more user accounts may be maintained at server 130. Each user account may be associated with one or more users, and may also be associated with one or more electronic devices. For the example embodiment depicted in FIG. 1, it may be assumed that the user account lists a single user, and further lists all of video playback device 110, video playback device 120, and external device 300. Of course, in other example embodiments more than one user may share a user account.

For the present example, an event "123" may be in progress on video playback device 110, and an event "456" may be in progress on video playback device 120. Also for this example, an event "789" and an event "987" may be resident on server 130. Event state monitor 135 may track various information related to the several events, and may maintain the user account information. As previously mentioned, the user account information may include a listing of external devices and system-connected devices, such as video playback devices, and may also include a listing of current events for the user or users associated with the user account. The user account information may further include information regarding the capabilities of the various external devices and/or system-connected devices associated with the user account. For example, server 130 may store information identifying external device 300, a cellular phone for this example, as having the capability of displaying a web page and the capability of receiving user input via a numeric keypad.

In one or more embodiments, event state monitor 135 may determine which of the events may be appropriate for external device 300 based at least in part on the characteristics and/or requirements of the events and at least in part on the capabilities of the external device. Also, event state monitor 135 may be continually and/or periodically updated based on actions taken by the user on any of the devices associated with the user account. Event state monitor 135 may, for an additional embodiment, track invitations received for the user from other users to join in various events such as, for example, chat sessions and/or movie viewing sessions. Persistent server events may also be monitored for an example embodiment.

Figure 2:
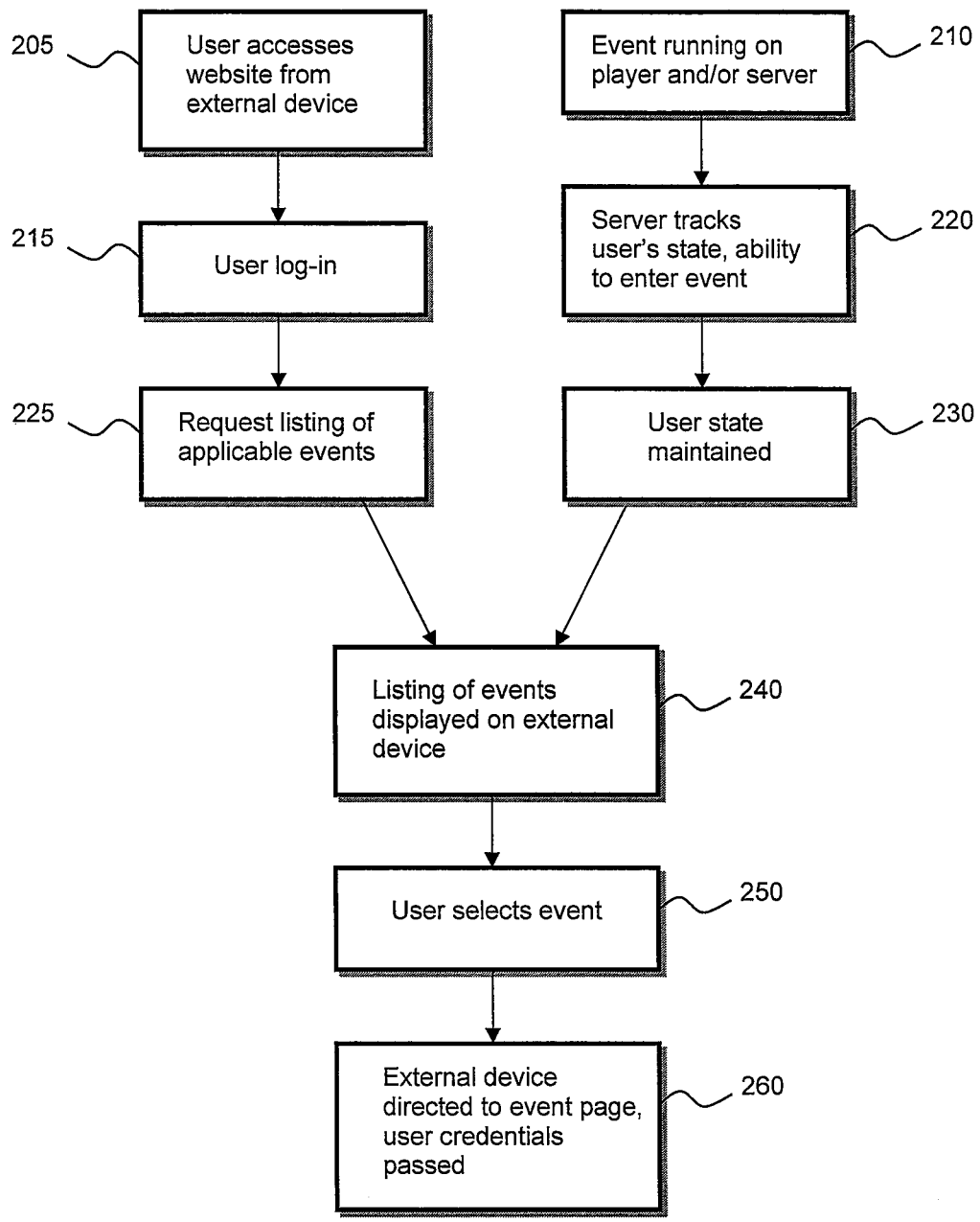
FIG. 2 is an illustration depicting an example process for monitoring events associated with a user and displaying event information to the user.

FIG. 2 is a flow diagram illustrating one example embodiment of a process for monitoring events at one or more electronic devices for one or more users, and for allowing a user to provide inputs for one or more events by way of a remote external device. For this example embodiment, at block 205, a user may access a website. The use may access the website from an external device. For one embodiment, the external device may comprise a cellular phone, although other embodiments are possible using other types of external devices including, but not limited to, personal digital assistants, personal music players, notebook computers, desktop computers, video game consoles, portable game systems, etc. At block 215, the user may log-in to the web site using credentials that may include, for example, a username and a password. The user may be presented a display of options, one or which may include an option to request a listing of applicable events, as depicted at block 225.

For an embodiment, one or more events may be running on a video disk player and/or a server, as depicted at block 210. At block 220, the server may track state information for events associated with the user, and may further track the user's ability to enter an event based at least in part on the capabilities of the various devices associated with the user. At block 230, the user's state information may be maintained, with updates performed on the state information as events transpire and/or as the user takes action. For one or more embodiments, processes associated with blocks 210, 220, and 230 for this example may be performed substantially concurrently with the processes associated with blocks 205, 215, and 225.

At block 240, at least in part in response to the user's request for a listing of applicable events depicted at block 225, a listing of event may be displayed on the external device. For one or more embodiments, the events may be chosen according to which events are current for the user, that is, which events are presently underway and/or scheduled to begin within a specified period of time. The events selected for display to the user may further be based at least in part on the capabilities of the external device. The selected events may be displayed to the user as a menu of current events appropriate for the external device. At block 250, the user may select an event from the menu of events. At block 260, the external device may be directed to an event page. For an embodiment, the event page may comprise a web page, and the web page may receive the user's credentials, such as, for example, the username and/or password and/or other information related to the user. Embodiments in accordance with claimed subject matter may include all of, less than, or more than blocks 205-260, and the order of blocks 205-260 is merely an example order.

Figure 3:
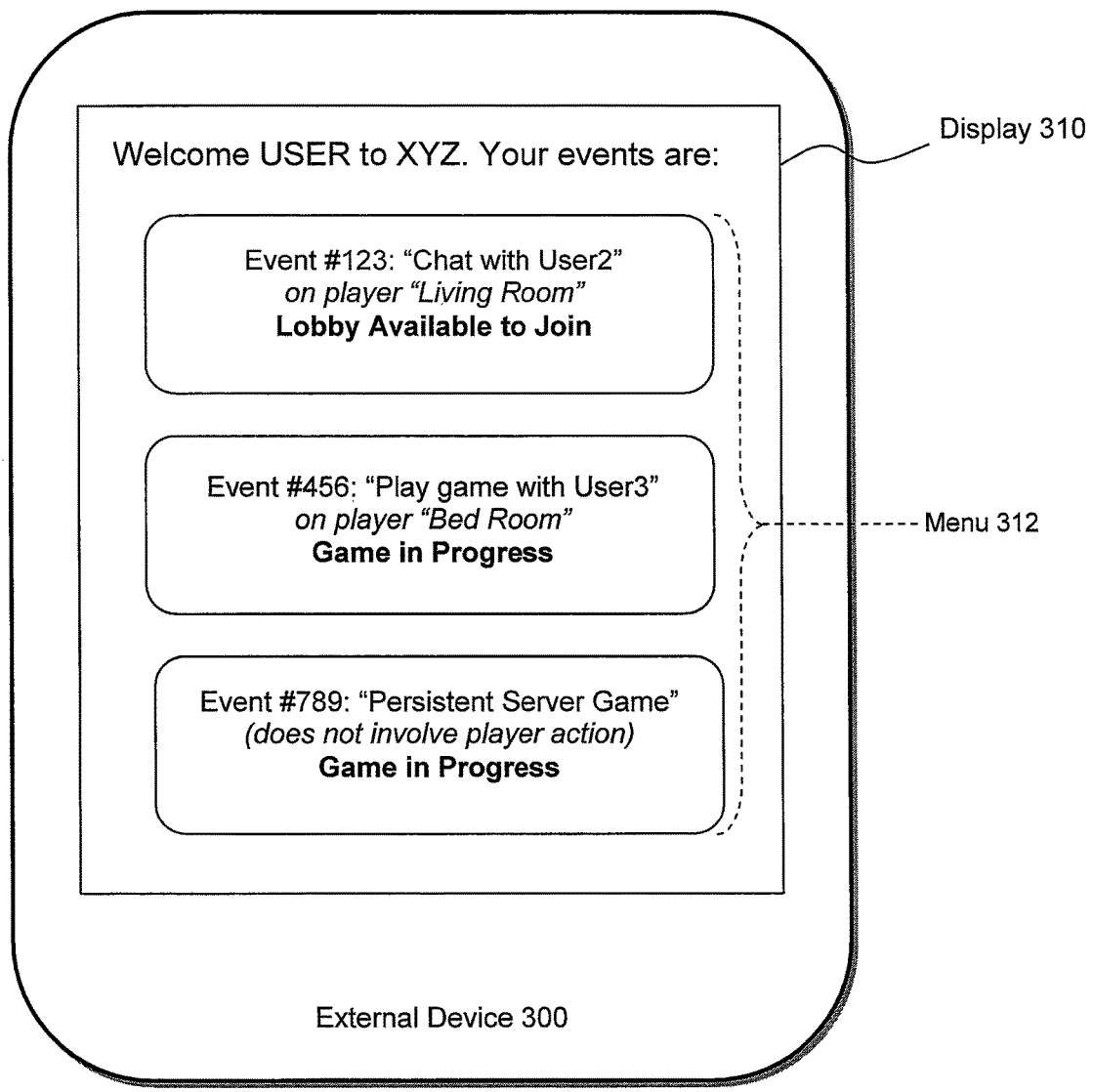
FIG. 3 is an illustration of an example external device displaying an event menu.

FIG. 3 is an illustration depicting a display 310 of external device 300. A menu 312 may be displayed, wherein the menu includes possible selections related to several events, as determined by server 130, for one example. The listing of events may include enough information to present a user with meaningful choices about which activity he or she may wish to participate in at a given moment. The information may include the identity of the device on which the event is to take place on, unless no device is needed such as, for example, a server event. The information may also include event type, and the event host, perhaps a friend of the user, for one example. Chronological data may also be included in the listing of events. For the example of the system depicted in FIG. 1, three events may be appropriate for external device 300. For the present example, events 123, 456, and 789 may be determined to be appropriate for the user in general and for the external device in particular. Also displayed by external device 300 is a caption identifying an entity such as, for an example, a movie studio or other system framework provider. For this example, a fictitious entity of "XYZ" is identified. Also, the username of the user may be displayed, as depicted in display 310 as "USER".

For the present example, event 123 may be titled "Chat with User2" which indicates a chat session with a friend of the user called User2. Event 123 is listed as residing on the player named "Living Room" which, for this example, comprises video display device 110. A state for this event is also displayed, which, for this example, indicates that the event is available to join for the user. Also for the present example, event 456 may be titled "Play game with User3" which indicates some sort of game application hosted on player "Bed Room". As previously mentioned, for this example, the "Bed Room" player comprises video playback device 120. As indicated, for this example the "game with user3" event is noted as "in progress". Event 789 for this example is titled "Persistent Server Game" which may indicate a game being executed from server 130. For this example, because the application related to the event is being executed on server 130, none of the video playback devices 110 and 120 are involved, as indicated in menu 312. The game is noted as being in progress, as also depicted in menu 312.

Upon viewing the displayed menu, the user may select one of the listed events, and the external device may be directed to a web page dedicated to the selected event. The external device may receive additional information related to the selected event, and the additional information may be displayed to the user, perhaps to prompt the user to provide additional inputs. Using the external device, the user may provide inputs related to the selected event. For example, if event 123 is selected, the user may be prompted to enter text as part of the chat session. The entered text may be delivered to video display device 110 by way of server 130. In this manner, a user may access one or more events occurring on one or more electronic devices by way of a remote external device, thereby providing the user with a convenient way to take greater advantage of features that may be implemented in video display devices and/or on digital video disks, for example.

Figure 4:
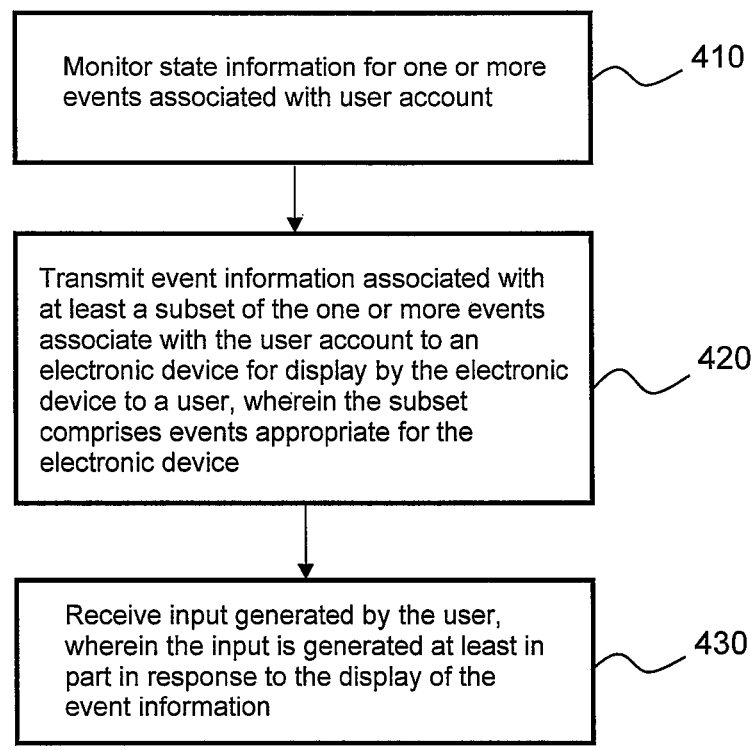
FIG. 4 is a flow diagram of an example embodiment of a method for transmitting event information to an external device for display to a user.

FIG. 4 is a flow chart of an example embodiment of a process for transmitting event information associated with a subset of events to an electronic device. At block 410, state information for one or more events associated with a user account may be monitored. Event information associated with at least a subset of the one or more events associated with the user account may be transmitted to an electronic device for display by the electronic device to a user. For an example embodiment, the subset of the one or more events may comprise events that are appropriate for the electronic device. The appropriateness may be determined based, at least in part, an the capabilities of the electronics device. At block 430, an input generated by the user may be received, wherein the input may be generated at the electronics device at least in part in response to the display of the event information depicted at block 420. Embodiments in accordance with claimed subject matter may include all, less than, or more than blocks 410-430, and the order of blocks 410-430 is merely an example order.

Figure 5:
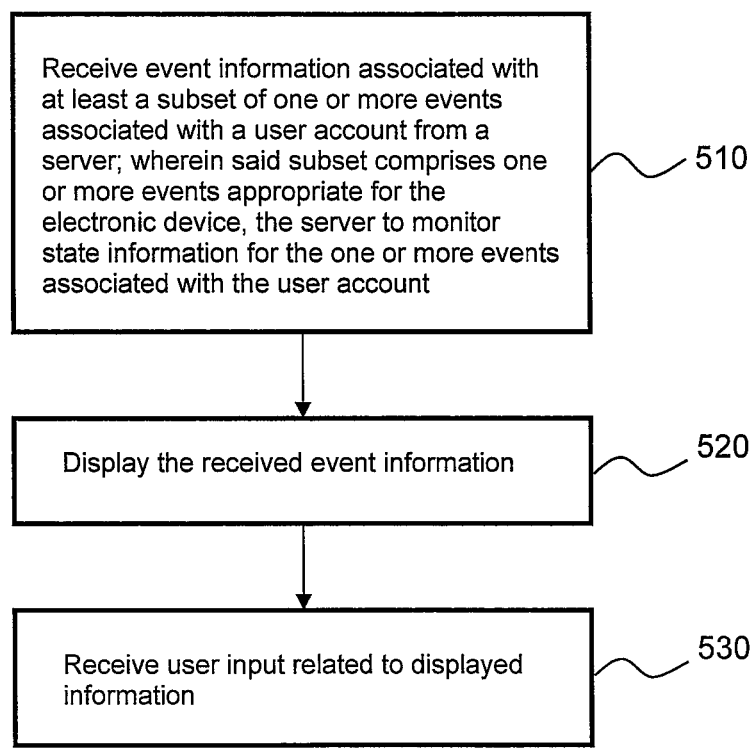
FIG. 5 is a flow diagram of an example embodiment of a method for receiving inputs from a user at an external device.

FIG. 5 is a flow diagram of an example embodiment of a process for receiving event information associated with event associated with a user account. The event information may be received at an external device, for an embodiment. At block 510, even information associated with at least a subset of one or more events associated with a user account may be received from a server. For an example embodiment, the subset may comprise one or more events appropriate for the electronic device, and the server may monitor state information for the one or more events associated with the user account. At block 520, the received event information may be displayed, and at block 530, user input related to the displayed event information may be received. The received user input may be transmitted, for one example embodiment, to one or more electronic devices hosting one or more of the events associated with the user account. Embodiments in accordance with claimed subject matter may include all, more than, or less than blocks 510-530, and the order of blocks 510-530 is merely an example order.

Figure 6:
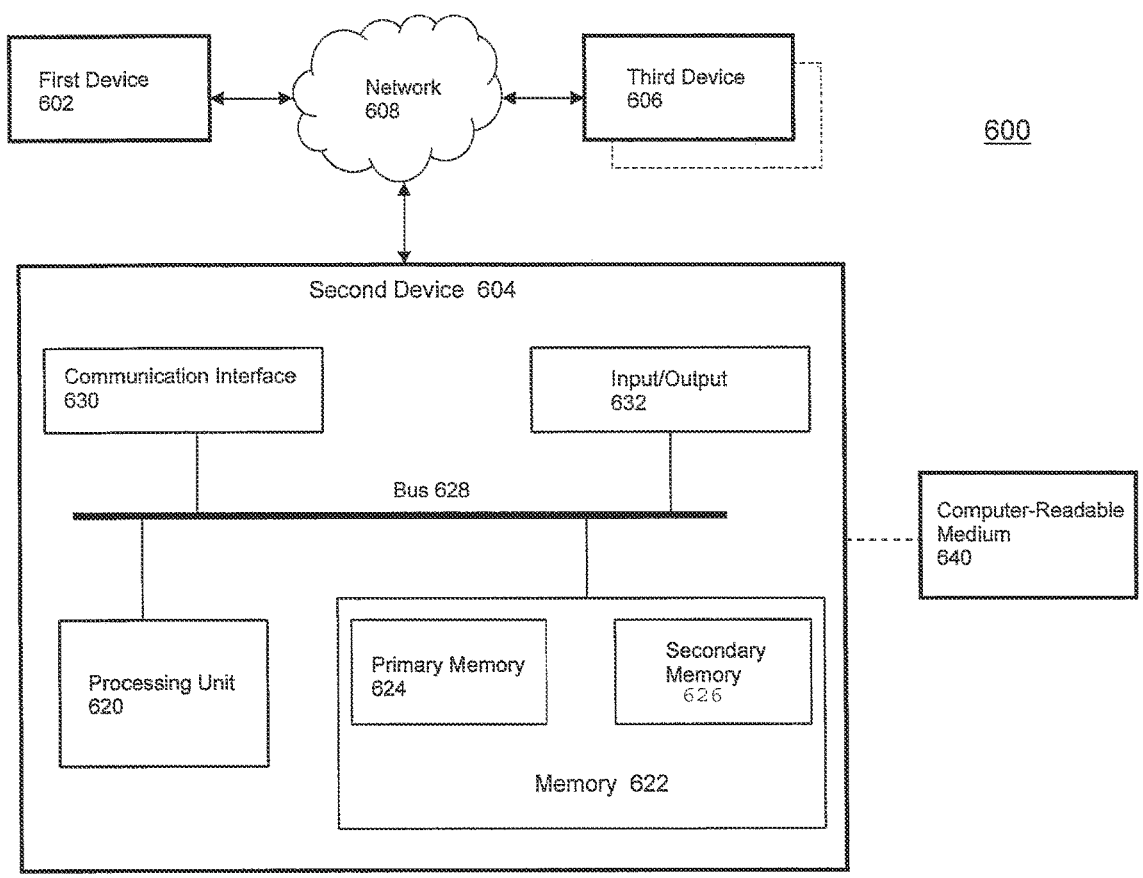
FIG. 6 is a block diagram illustrating an example system comprising a plurality of computing devices coupled via a network in accordance with one or more embodiments.

FIG. 6 is a schematic diagram illustrating an exemplary embodiment of a computing environment system 600 that may include one or more devices configurable to implement techniques and/or processes described above in connection with the creation and/or storage and/or transmission and/or playing of messages discussed above in connection with FIGS. 1-5, for example. System 600 may include, for example, a first device 602, a second device 604, and a third device 606, which may be operatively coupled together through a network 608.

First device 602, second device 604 and third device 606, as shown in FIG. 6, may be representative of any device, appliance or machine that may be configurable to exchange data over network 608. By way of example but not limitation, any of first device 602, second device 604, or third device 606 may include: one or more computing devices and/or platforms, such as, e.g., a desktop computer, a laptop computer, a stand-alone digital video object playback device, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Of course, any or all of first device, second device, and/or third device may comprise a digital video playback device for one or more embodiments.

Similarly, network 608, as shown in FIG. 6, is representative of one or more communication links, processes, and/or resources configurable to support the exchange of data between at least two of first device 602, second device 604, and third device 606. By way of example but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 606, there may be additional like devices operatively coupled to network 608.

It is recognized that all or part of the various devices and networks shown in system 600, and the processes and methods as further described herein, may be implemented using or otherwise include hardware, firmware, software, or any combination thereof.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 640. Computer-readable medium 640 may include, for example, any medium that can carry and/or make accessible data, code and/or instructions for one or more of the devices in system 600.

Second device 604 may include, for example, a communication interface 630 that provides for or otherwise supports the operative coupling of second device 604 to at least network 608. By way of example but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

In the detailed description herein, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. An embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/ or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that if executed by an electronic device, such as a digital video playback device, a computer, a computing platform and/or system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. For one or more embodiments, instructions may be stored on an optical video disc such as, for example, a disk compliant with and/or compatible with the Blu-ray format. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

Unless specifically stated otherwise, as apparent from the discussion herein, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
maintaining, at a server, a list of at least two system-connected video playback devices associated with a user account, wherein the at least two system-connected video playback devices communicate via one or more messages of a messaging application, wherein the one or more messages are associated with one or more scenes of video content played back by the at least two system-connected video playback devices, wherein the messaging application is hosted by one or more of the at least two system-connected video playback devices;

storing, at the server, data associated with the user account, the data identifying an external device that is distinct from the server and the at least two system-connected video playback devices, the data further identifying one or more capabilities of the external device;

monitoring, with an event state monitor at the server, state information for one or more interactive events associated with the user account, the one or more interactive events occurring at a first video playback device of the at least two system-connected video playback devices listed in the list of system-connected video playback devices, wherein a start time of the one or more interactive events is determined by the messaging application;

transmitting, from the server to the external device, the state information so that the external device displays the state information;

receiving, at the server from the external device, a user input generated in response to the display of the state information by the external device; and transmitting, from the server to a second video playback device of the at least two system-connected video playback devices, the user input so that the second video playback device performs an operation associated with the messaging application based on the user input.

2. The method of claim 1, wherein the external device is selected from the group consisting of: a cellular telephone, a personal music player, a laptop computer system, a desktop computer system, a video game console, and a portable video game player.

3. The method of claim 1, wherein said transmitting the state information comprises transmitting a menu listing the one or more interactive events.

4. The method of claim 1, wherein said transmitting the state information comprises transmitting information identifying an event type.

5. The method of claim 1, wherein said transmitting the state information comprises transmitting chronological data for one or more of the listed events.

6. The method of claim 5, wherein said transmitting the state information comprises transmitting information identifying a host or a video playback device associated with each of the listed events.

7. An article, comprising: a storage device having stored thereon instructions that, if executed, enable a computing platform to:
 maintain, at a server, a list of at least two system-connected video playback devices associated with a user account, wherein the at least two system-connected video playback devices communicate via one or more messages of a messaging application, wherein the one or more messages are associated with one or more scenes of video content played back by the at least two system-connected video playback devices, wherein the messaging application is hosted by one or more of the at least two system-connected video playback devices;
 store, at the server, data associated with the user account, the data identifying an external device that is distinct from the server and the at least two system-connected video playback devices, the data further identifying one or more capabilities of the external device;
 monitor, with an event state monitor at the server, state information for one or more interactive events associated with the user account, the one or more interactive events occurring at a first video playback device of the at least two system-connected video playback devices listed in the list of system-connected video playback devices, wherein a start time of the one or more interactive events is determined by the messaging application;
 transmit, from the server to the external device, the state information so that the external device displays the state information;
 receive, at the server from the external device, a user input generated in response to the display of the state information by the external device; and
 transmit, from the server to a second video playback device of the at least two system-connected video playback devices, the user input so that the second video playback device performs an operation associated with the messaging application based on the user input.

8. The article of claim 7, wherein the external device is selected from the group consisting of: a cellular telephone, a personal music player, a laptop computer system, a desktop computer system, a video game console, and a portable video game player.

9. The article of claim 7, wherein said transmitting the state information comprises transmitting a menu listing the one or more interactive events.

10. The article of claim 7, wherein said transmitting the state information comprises transmitting information identifying an event type.

11. The article of claim 7, wherein said transmitting the state information comprises transmitting chronological data for one or more of the listed events.

12. The article of claim 11, wherein said transmitting the state information comprises transmitting information identifying a host or a video playback device associated with each of the listed events.

13. A system, comprising:
 a server that maintains a list of at least two system-connected video playback devices associated with a user account, stores data associated with the user account, monitors state information for one or more interactive events associated with the user account, transmits the state information so that the external device displays the state information, receives, from the external device, a user input generated in response to the display of the state information by the external device, and transmits the user input to a second video playback device of the at least two system-connected video playback devices so that the second video playback device performs an operation associated with the messaging application based on the user input, the data identifying an external device that is distinct from the server and the at least two system-connected video playback devices, the data further identifying one or more capabilities of the external device, the one or more interactive events occurring at a first video playback device of the at least two system-connected video playback devices listed in the list of system-connected video playback devices, the state information corresponding to the one or more interactive events, wherein the at least two system-connected video playback devices communicate via one or more messages of a messaging application, wherein the one or more messages are associated with one or more scenes of video content played back by the at least two system-connected video playback devices, wherein the messaging application is hosted by one or more of the at least two system-connected video playback devices, wherein a start time of the one or more interactive events is determined by the messaging application, wherein the external device displays the state information.

14. The system of claim 13, wherein the external device is selected from the group consisting of: a cellular telephone, a personal music player, a laptop computer system, a desktop computer system, a video game console, and a portable video game player.

15. The system of claim 13, wherein said transmitting the state information comprises transmitting a menu listing the one or more interactive events.

16. The system of claim 13, wherein said transmitting the state information comprises transmitting information identifying an event type.

17. The system of claim 13, wherein said transmitting the state information further comprises transmitting chronological data for one or more of the listed events.

18. The system of claim 17, wherein said transmitting the state information further comprises transmitting information identifying a host or a video playback device associated with each of the listed events.

* * * * *